United States Patent [19]
Helevirta

[11] Patent Number: 5,819,436
[45] Date of Patent: Oct. 13, 1998

[54] METHOD AND AN APPARATUS FOR VACUUM DRYING OF A MATERIAL

[75] Inventor: Kauko Helevirta, Tampere, Finland

[73] Assignee: High Speed Tech Oy Ltd., Tampere, Finland

[21] Appl. No.: 765,628

[22] PCT Filed: Jul. 3, 1995

[86] PCT No.: PCT/FI95/00382

§ 371 Date: Feb. 26, 1997

§ 102(e) Date: Feb. 26, 1997

[87] PCT Pub. No.: WO96/01401

PCT Pub. Date: Jan. 18, 1996

[30] Foreign Application Priority Data

Jul. 6, 1994 [FI] Finland ..................................... 943225

[51] Int. Cl.[6] .................................................. F26B 5/04
[52] U.S. Cl. .................................................. 34/408; 34/92
[58] Field of Search ............................ 34/92, 86, 402, 34/403, 406, 407, 408, 361

[56] References Cited

U.S. PATENT DOCUMENTS

| | | | |
|---|---|---|---|
| 3,574,949 | 4/1971 | Farnsworth | 34/16.5 |
| 3,909,957 | 10/1975 | Passey | 34/92 |
| 4,027,401 | 6/1977 | Fairbanks, Jr. | 34/16.5 |
| 4,194,296 | 3/1980 | Pagnozzi et al. | 34/92 |
| 4,260,335 | 4/1981 | Marchal | 417/68 |
| 4,343,095 | 8/1982 | Rosen et al. | 34/16.5 |
| 4,467,532 | 8/1984 | Drake | 34/16.5 |
| 4,621,437 | 11/1986 | Grande et al. | 34/361 |
| 4,644,664 | 2/1987 | Bradshaw | 34/361 |
| 4,753,016 | 6/1988 | Eichholz | 34/86 |

FOREIGN PATENT DOCUMENTS

| | | |
|---|---|---|
| 793297 | of 0000 | Finland . |
| 2113078 | of 0000 | Germany . |
| 42 08 913 | of 0000 | Germany . |
| 520286 | of 0000 | Germany . |

*Primary Examiner*—William Doerrler
*Attorney, Agent, or Firm*—Pollock, Vande Sande & Priddy

[57] ABSTRACT

The invention provides a method and an apparatus for vacuum drying of a material, particularly timber or the like. The apparatus comprises a drying chamber (1), a vacuum producing unit (6) coupled with the drying chamber, a cooler structure (2,4), and devices for heating the drying chamber (1). The cooler structure (2,4) and the drying chamber (1) are coupled together by a compression unit (9) that may be placed substantially within the drying chamber (1). The cooler structure (2,4) is placed at least partially in a heat transfer connection with the drying chamber (1).

18 Claims, 3 Drawing Sheets

METHOD AND AN APPARATUS FOR VACUUM DRYING OF A MATERIAL

TECHNICAL FIELD

The invention relates to a method for vacuum drying of a material, particularly timber or the like. The apparatus using the method comprises a drying chamber, a vacuum producing unit connected with the same, a cooler structure, and a compression unit.

BACKGROUND OF THE INVENTION

The present invention relates substantially to vacuum drying of a material, particularly timber. The process itself is generally known, wherein the pressure of the drying chamber is lowered in order to make evaporation of water effective in as low a temperature as possible, in view of power consumption, quality of dried wood and time needed for completing the drying process. A steam atmosphere as pure as possible is created in the drying chamber. Normally, drying is conducted by an ordinary vacuum pump. The drying process can also be made more effective particularly in the beginning by heating up the timber e.g. by blowing steam, particularly superheated steam into the drying chamber. For maintaining the steady condition of the drying process after the preheating stage, steam prevalent in the drying chamber is usually superheated by supplying heat to the drying chamber and by discharging steam from the drying chamber, whereby evaporation of water from the timber or the like can be continued. The drying chamber is externally connected to a condenser and a collector, where the steam removed from the drying chamber is condensed. The condensed liquid is removed from the collecting chamber e.g. by a conventional pump. The drying process can be accelerated, as mentioned above, by supplying supplementary energy to the drying chamber from the outside, e.g. by using heat exchangers placed inside the drying chamber, and also by cooling the condenser. In a conventional drying process, heat from the condenser is useful for a secondary purpose but its direct utilization in the actual drying process is impractical, because the temperature of the heat released by the condenser is lower than the temperature in the drying chamber.

In respect of prior art, reference is also made to the patents U.S. Pat. No. 4,753,016 and U.S. Pat. No. 4,194,296 disclosing solutions for raising the temperature of the steam released from the drying chamber in order to re-use heat energy discharged from the process in the drying process.

In U.S. Pat. No. 4,753,016, vacuum drying is developed in a manner that in addition to the actual vacuum pump used for producing a vacuum, the steam channel comprises upstream a separate compressor or a steam pump for raising the pressure and temperature of the steam coming from the drying chamber. Further, using a separate water circulation and a heat exchanger, the heat from the driving motors of the vacuum pump and the compressor is utilized by feeding the return water from the water circulation into an annular water pump used as the vacuum pump. When the drying process is effective and has a good operating efficiency, both compressors must be continuously operating and the liquid evaporated in the drying chamber must pass primarily through both compressors, whereafter the collected heat energy is re-used in the drying process.

The publication U.S. Pat. No. 4,194,296 discloses a vacuum pump producing steam sucked from the drying chamber, the heat of the steam being collected into a heat exchanger placed downstream from the vacuum pump, wherein a heat transfer medium used for heating the drying chamber is conveyed to the heat exchanger.

SUMMARY OF THE INVENTION

It is an aim of the present invention to improve the process of vacuum drying further in a manner that the heat energy of the steam produced in the drying process of a material, particularly timber, can be utilized efficiently. Consequently, the primary aim of the present invention is to raise the standard of technology in the field. For achieving these aims, the method according to the invention is primarily characterized in that steam is discharged from the drying chamber through a compression unit, that the pressure and temperature of the steam are raised by the compression unit, and that part of the heat energy of the steam, having a pressure and temperature raised in the compression unit, is transferred to the drying chamber by using a cooler structure. On the basis of what is presented above, the invention consequently utilizes a tried and found vacuum drying process, where the steam discharged from the drying chamber is condensed in a cooler structure connected to the drying chamber, whereby said condensation substantially maintains the vacuum drying process in a steady state. Such a vacuum process involves a compression unit, particularly a compressor, provided in front of the cooler structure, for raising the pressure and temperature of the steam discharged from the drying chamber. With to this compression unit, the temperature of the steam in the cooler structure is higher than the temperature in the drying chamber. Consequently the cooler structure, which may be at least partially placed in a heat transfer connection with the drying chamber, either directly or indirectly, can release a substantial part of the heat energy of the steam streaming in the, cooler structure into the drying chamber. This heat energy is released preferably upon cooling of superheated steam and upon condensation of steam. The cooler structure can be either partially or wholly placed within the drying chamber. The cooler structure can also be partially or wholly separate from the drying chamber, wherein the heat energy of the steam contained in the cooler structure can be transferred to the drying chamber by a separate heat transfer circuit in connected to the cooler structure.

Some advantageous embodiments of the method according to the invention are also disclosed in the other dependent claims on the method.

The invention also provides an apparatus for vacuum drying of a material, particularly timber or the like. The primary characteristic features of the apparatus are presented in the independent claim on the apparatus.

Some advantageous embodiments of the apparatus are also presented in the dependent claims on the apparatus.

BRIEF DESCRIPTION OF THE DRAWINGS

In the following, the invention will be described in more detail with reference to embodiments shown in the appended drawings. In the drawings.

DETAILED DESCRIPTION OF THE INVENTION

Figure 1:
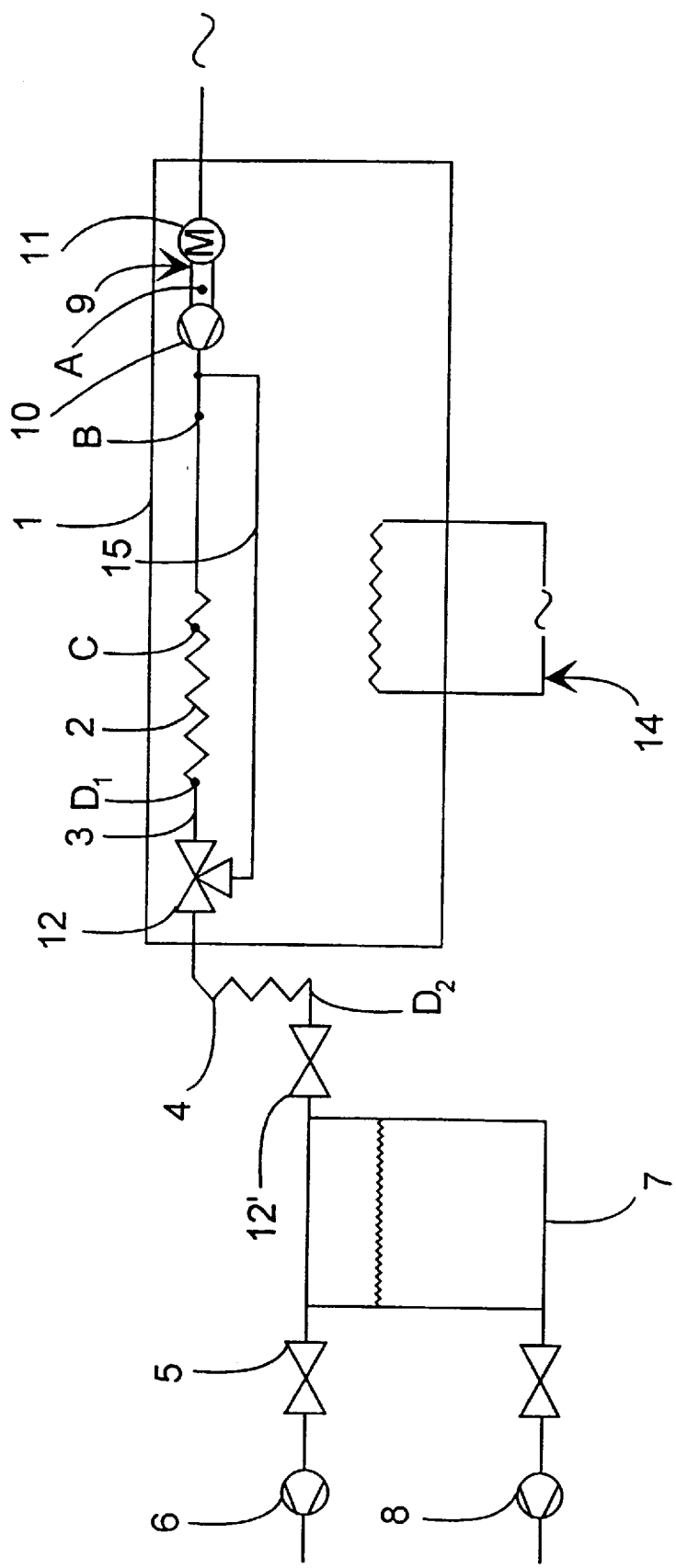
FIGS. 1 and 2 show schematics views of alternative embodiments of the apparatus according to the invention.

A vacuum drying process take place in an where the apparatus according to the invention comprising a drying chamber 1, in which the material to be dried is placed and closed for the time of the drying process. In the embodiment shown in FIG. 1, the drying chamber 1 is provided with a first part 2 of a cooler structure and possibly with one or several parallel by-pass lines, such as a by-pass tube 15, which are connected by a connecting line 3 to a second part 4 of the cooler structure outside the drying chamber. The second part 4 is connected via a valve structure 5 to a unit 6 for producing a vacuum. The vacuum producing unit 6 is used particularly in the beginning of the drying process as well as for controlling the process.

Downstream from the cooler structure 2, 4 in the process line, there is a collecting chamber 7 for collecting condensed water and removing it from the process by a pump 8.

One or more compression units 9 are provided in the drying chamber 1, each consisting of a combination of a compressor 10 and a motor 11 for driving the same. The unit formed by one or several compressors 10 and a cooler structure 2, 4 is provided with one or several valves 12 or 12' for adjusting the level of condensation in different parts of the cooler structure 2, 4.

Figure 2:
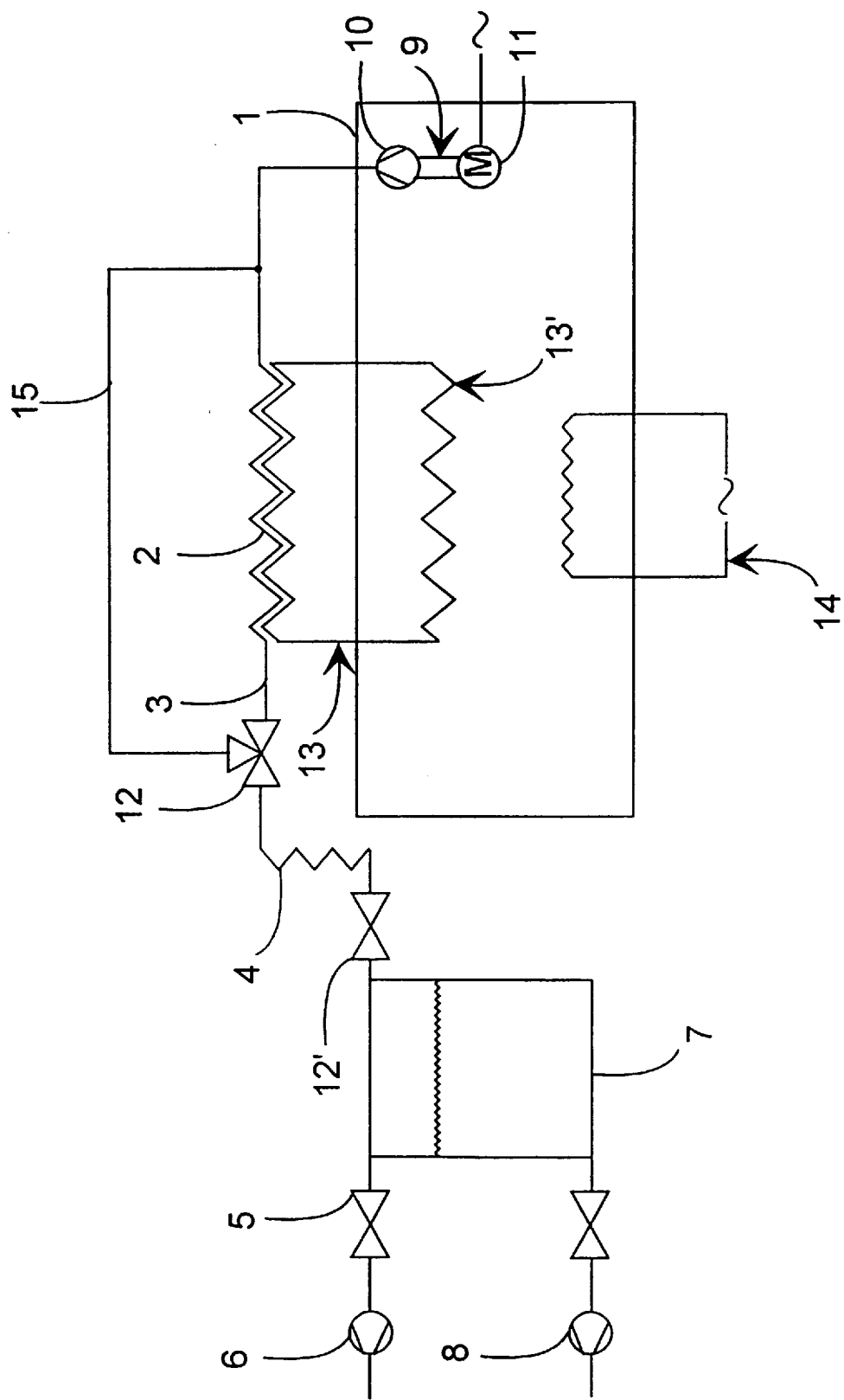

Particularly FIG. 2 shows an alternative for the apparatus according to the invention, where the cooler structure 2, 4 is placed outside the drying chamber 1 and a heat transfer circuit 13 is formed in connection with the same on at least part of the heat transfer surface of the first part 2 of the cooler structure. This heat transfer circuit 13 is, in turn, placed partially within the drying chamber 1. As shown in FIGS. 1 and 2, the drying chamber is also provided with an additional heating circuit 14, e.g. water, electricity, steam or gas. The circuit 14 can also be provided for cooling.

The drying process can be adjusted e.g. by valves 12, 12' for adjusting the quantity of heat energy from the steam to be cooled and/or condensed released to the part 2 of the cooler structure in the drying chamber (FIG. 1) or to the part 13' of the heat transfer circuit 13 in the drying chamber (FIG. 2) and on the other hand to the second part 4 of the cooler structure. This adjustment can be made also alternatively with or in addition to the adjustment mentioned above by adjusting the pressure of the compressor 10. When a kinetic compressor is used, the pressure adjustment is preferably made by adjusting its rotational speed. Further, the drying chamber 1 can be provided with various systems, e.g. fans and guide means, for circulating heat in the drying chamber 1 and thus for transferring it into the material to be dried. It is also advantageous to provide optimal thermal insulation of particularly the drying chamber 1 in a manner that the heat energy to be utilized in the drying process, at a suitable high temperature, is not exessively released from the drying process.

It is particularly advantageous in the apparatus according to the invention that the compressor with its driving motor 11, i.e. the compression unit 9 is placed wholly within the drying chamber, whereby the waste heat of both the compressor and the driving motor can be totally used in heating up the drying chamber 1.

The compressor is advantageously axial or radial, operating on the kinetic principle. The bearings of the compression unit 9 can have oilless bearings, particularly magnetic bearings, whereby the suspension is accomplished by a magnetic field. Alternatively for lubricated bearings, such as gas or liquid lubricated bearings, steam or liquid can be used for lubrication, preferably by liquefying steam produced in the drying process and/or by an inert gas or liquid which can be mixed into the gases and liquids in the process without interfering with the process. The cooler structure, particularly its first part 2, can be constructed of several parts, wherein preferably each part is provided with at least one valve 12 and/or 12' adjusted according to the need for heat transfer. Further, one or several by-pass tubes 15 can be coupled, to the first part 2, and may be isolated from the drying chamber 1 (FIG. 1) or extend outside the same (FIG. 2). Thus it is possible to adjust the first part 2 of the cooler structure at different levels of usage.

Figure 3:
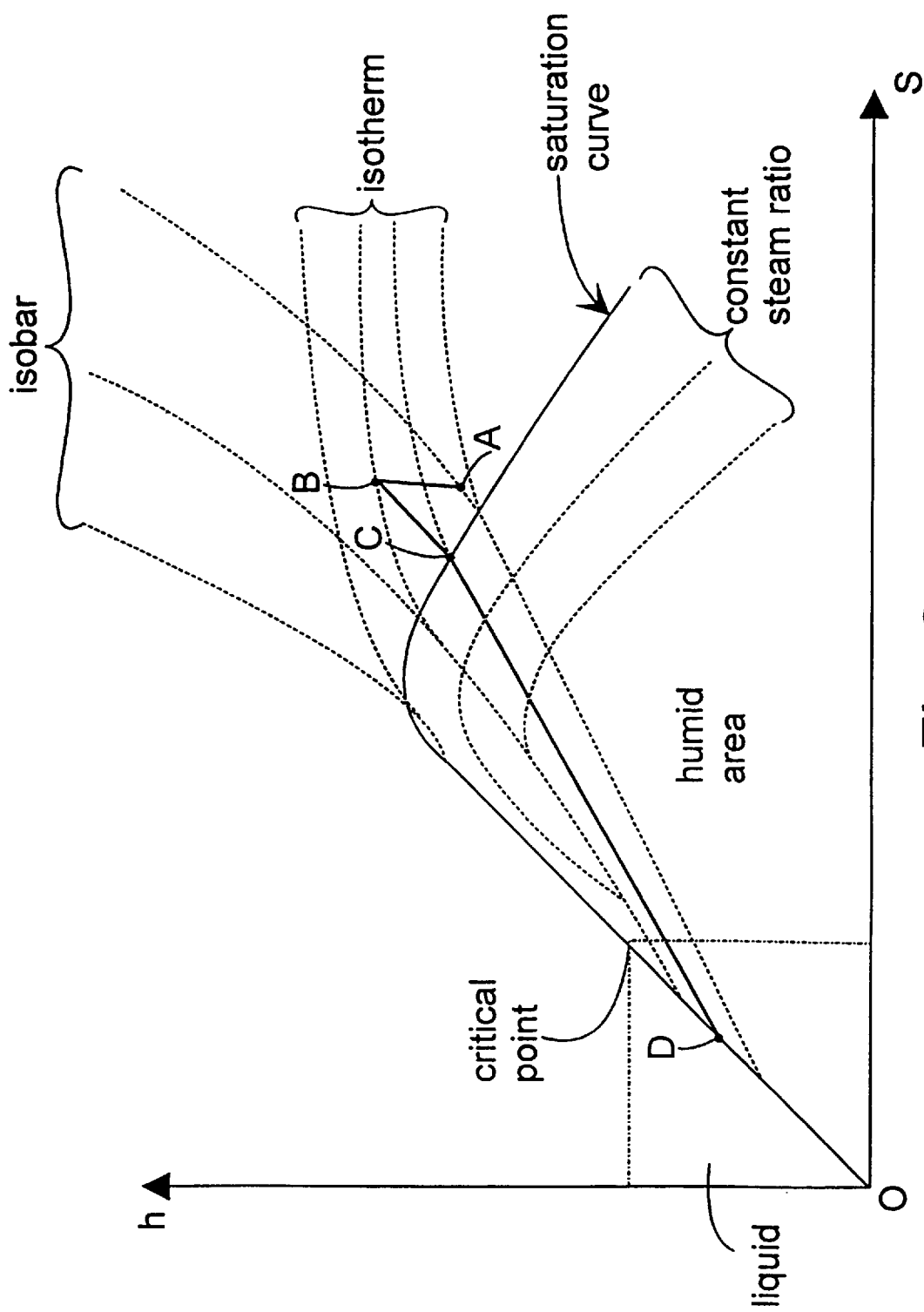
FIG. 3 shows a schematic HS-diagram of the process according to the invention.

The process described above is further illustrated in FIG. 3, where points A to D indicate the phase of the steam at corresponding points A–$D_1$ or $D_2$ in FIG. 1. At point A, the steam exiting the drying chamber 1 is slightly superheated. This point also corresponds to the situation on the suction side of the compression unit 9. At point B, the pressure and temperature of the steam are raised, the steam is further superheated and its heat energy is increased. Between points B to C, the steam releases its heat energy of the superheated range in the cooler structure 2, 4, wherein its temperature is decreased. Between points C to D, in FIG. 3, the steam is cooled at a constant temperature (i.e. the process is approximately isothermic), releasing its heat energy into the drying chamber 1. The substantial enthalpy of the steam available is released inside the drying chamber 1, wherein the point $D_1$=D in FIG. 3, or alternatively in a manner that a part of the enthalpy of the steam is released outside the drying chamber 1, wherein the point $D_2$=D in FIG. 3. Further in the cooling structure 2, 4 the process follows approximately the isobar, i.e. has a constant pressure. Using the compression unit 9, particularly its pressure level, as well as the valves 12, 12', the operating range and the quantity of heat transfer can be adjusted in the heat transfer process.

By circulating the steam of the drying chamber as well as by the speed of the drying process, the quantity of steam superheating and power consumption for drying can be affected. At an ordinary drying speed and at that stage of the process with the highest power consumption, drying can be effected at $\frac{1}{20}$ of the power consumption compared with conventional drying. Consequently the total energy consumption of the mill as well as the connected load required by it are remarkably decreased.

I claim:

1. A method for vacuum drying of a material, said method comprising:

placing the material to be dried in a drying chamber;

producing a vacuum in the drying chamber by a vacuum producing unit, said vacuum causing steam to be produced; and discharging steam produced by the vacuum to the vacuum producing unit through a compression unit and a cooler structure having a heat transfer connection with the drying chamber, the compression unit being in front of the cooler structure and the cooler structure being in front of the vacuum producing unit;

the pressure and temperature of the steam being raised by the compression unit, and the heat energy of the steam, having a pressure and temperature raised by the compression unit, being transferred at least partly to the drying chamber by the cooler structure.

2. A method according to claim 1 wherein the heat transfer to the drying chamber is adjusted by a control device, such as a valve or the like, placed downstream of the cooler structure and upstream of the vacuum producing unit, or by changing the pressure level of the compression unit.

3. A method according to claim 2, wherein a by-pass line is placed at least partly in parallel with the cooler structure and is connected with a second control device, such as a valve or the like, for controlling the heat transfer to the drying chamber by directing the steam discharged from the compression unit to the cooler structure, to the by-pass line, or to both.

4. A method according to claim 1, wherein a by-pass line is placed at least partly in parallel with the cooler structure and is connected with a control device, such as a valve or the like, for controlling the heat transfer to the drying chamber by directing the steam discharged from the compression unit to the cooler structure, to the by-pass line, or to both.

5. A method according to claim 1, wherein the compression unit is placed substantially in the drying chamber.

6. An apparatus for vacuum drying of a material, said apparatus comprising:
   a drying chamber;
   a vacuum unit for providing a vacuum in the drying chamber which causes steam to be produced; and
   a compression unit and a cooler structure through which the steam from the drying chamber is discharged to the vacuum unit, the compression unit being in front of the cooler structure to raise the pressure and temperature of the steam, and the cooler structure being in front of the vacuum unit and having a heat transfer connection with the drying chamber for transferring substantial heat energy from the steam after its pressure and temperature have been raised by the compression unit.

7. An apparatus according to claim 6, wherein the cooler structure is at least partially placed in the drying chamber.

8. An apparatus according to claim 6, wherein the cooler structure is at least partially coupled to a heat transfer circuit, a part of which is in the drying chamber.

9. An apparatus according to claim 6, wherein the compression unit includes driving equipment placed substantially in the drying chamber.

10. An apparatus according to claim 9, wherein the compression unit comprises at least one compressor and a driving motor coupled to each other.

11. An apparatus according to claim 6, wherein the compression unit comprises at least one compressor and a driving motor coupled to each other.

12. An apparatus according to claim 6, wherein a control device, such as at least one valve or the like, is included in the cooler structure.

13. An apparatus according to claim 6, wherein the compression unit comprises at least one compressor that operates on the kinetic principle, wherein by adjusting its rotational speed, the temperature and pressure level of the steam to be supplied to the cooler structure is controlled.

14. An apparatus according to claim 6, wherein the compression unit includes bearings arranged to be lubricated by a liquified phase of steam produced in the drying process, by a liquid, or by an inert gas, which can be mixed into the gases or liquids of the drying process without interfering with the process.

15. An apparatus according to claim 6, wherein the compression unit includes magnetic suspension bearings.

16. An apparatus according to claim 6, wherein the compression unit has a heat transfer connection with the drying chamber by being placed at least partially within the drying chamber.

17. An apparatus according to claim 6, wherein a supplementary heating or cooling circuit is placed within the drying chamber.

18. An apparatus according to claim 6, wherein the cooler structure comprises a first part provided in the drying chamber and a second part provided outside the drying chamber, and wherein a control device, such as a valve or the like, is placed between the first and the second parts.

* * * * *